March 5, 1957 K. W. MATTHES 2,784,299
METHOD AND APPARATUS FOR WELDING SHEET METAL
Filed April 5, 1954 4 Sheets-Sheet 2
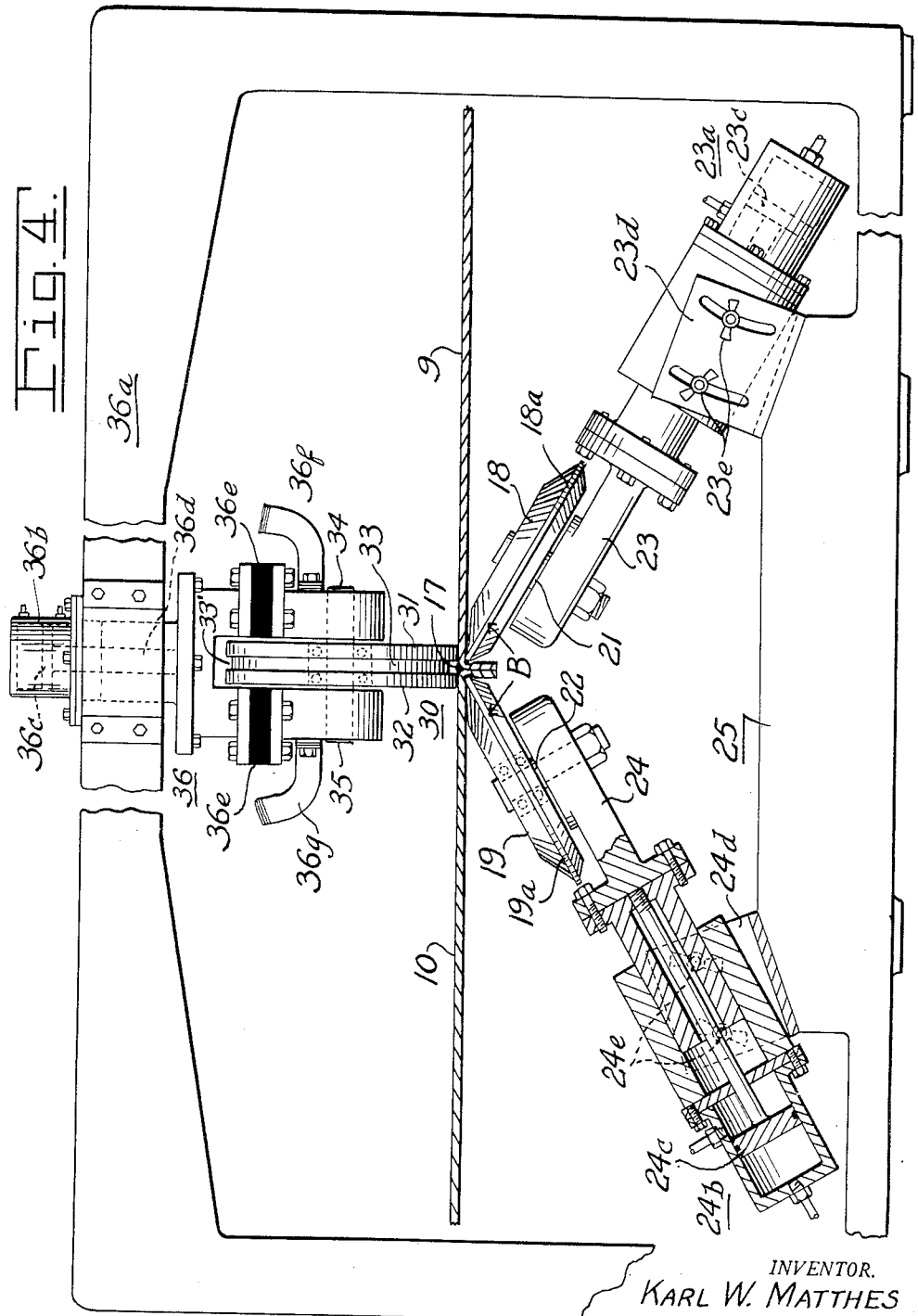
INVENTOR.
KARL W. MATTHES
BY
Zugelter & Zugelter
Attys.

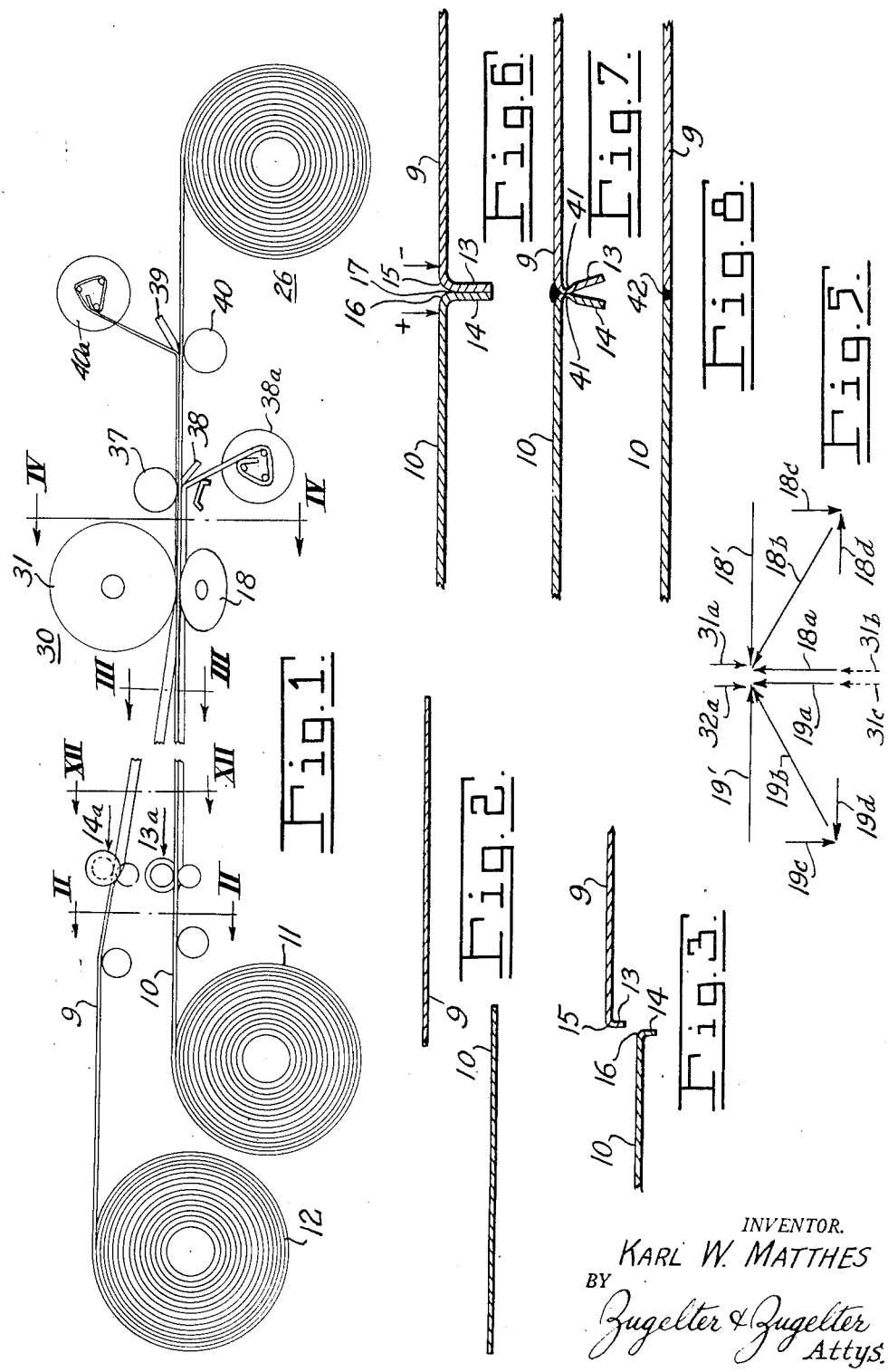

March 5, 1957 K. W. MATTHES 2,784,299
METHOD AND APPARATUS FOR WELDING SHEET METAL
Filed April 5, 1954 4 Sheets-Sheet 3
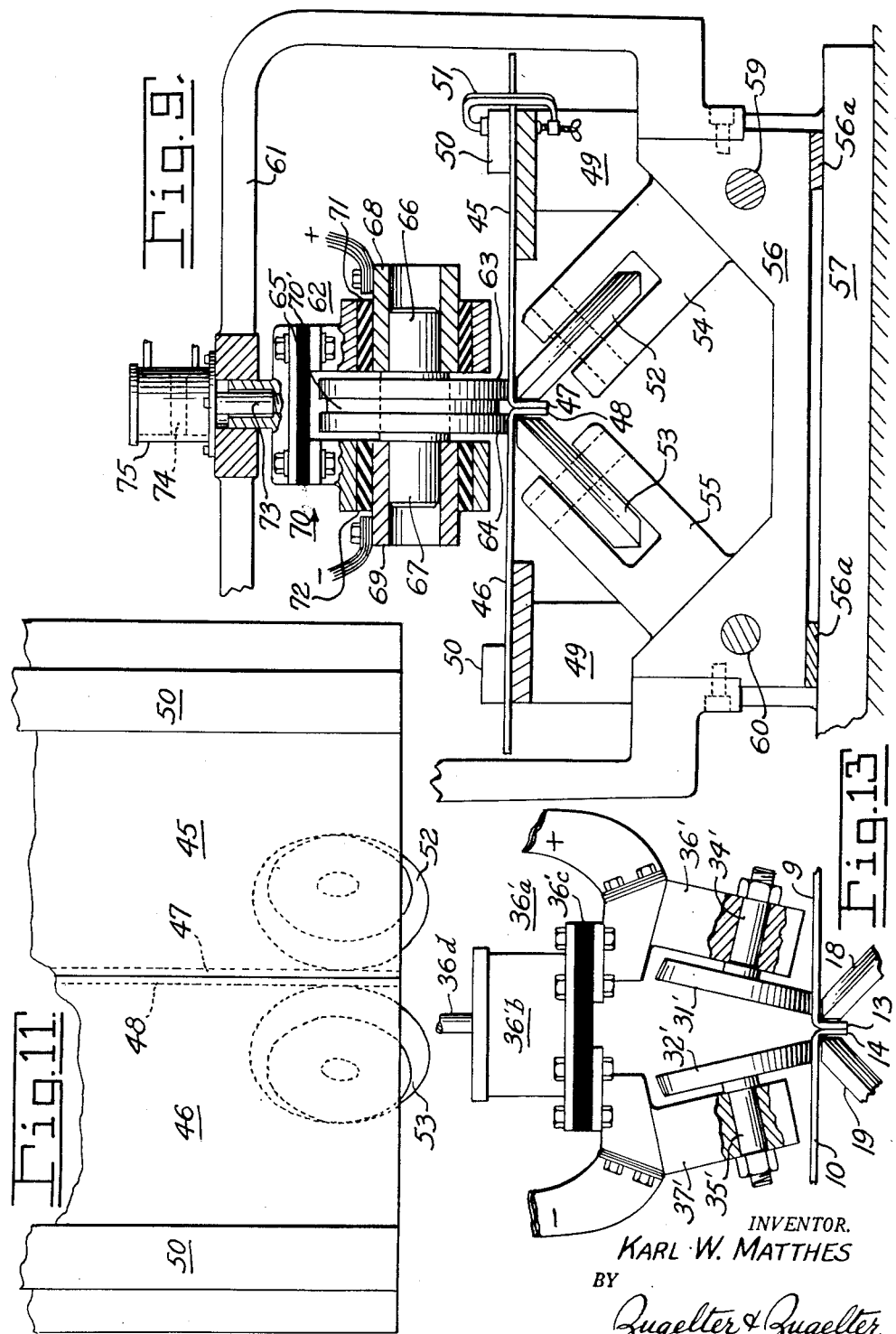
INVENTOR.
KARL W. MATTHES
BY
Zugelter & Zugelter
Attys.

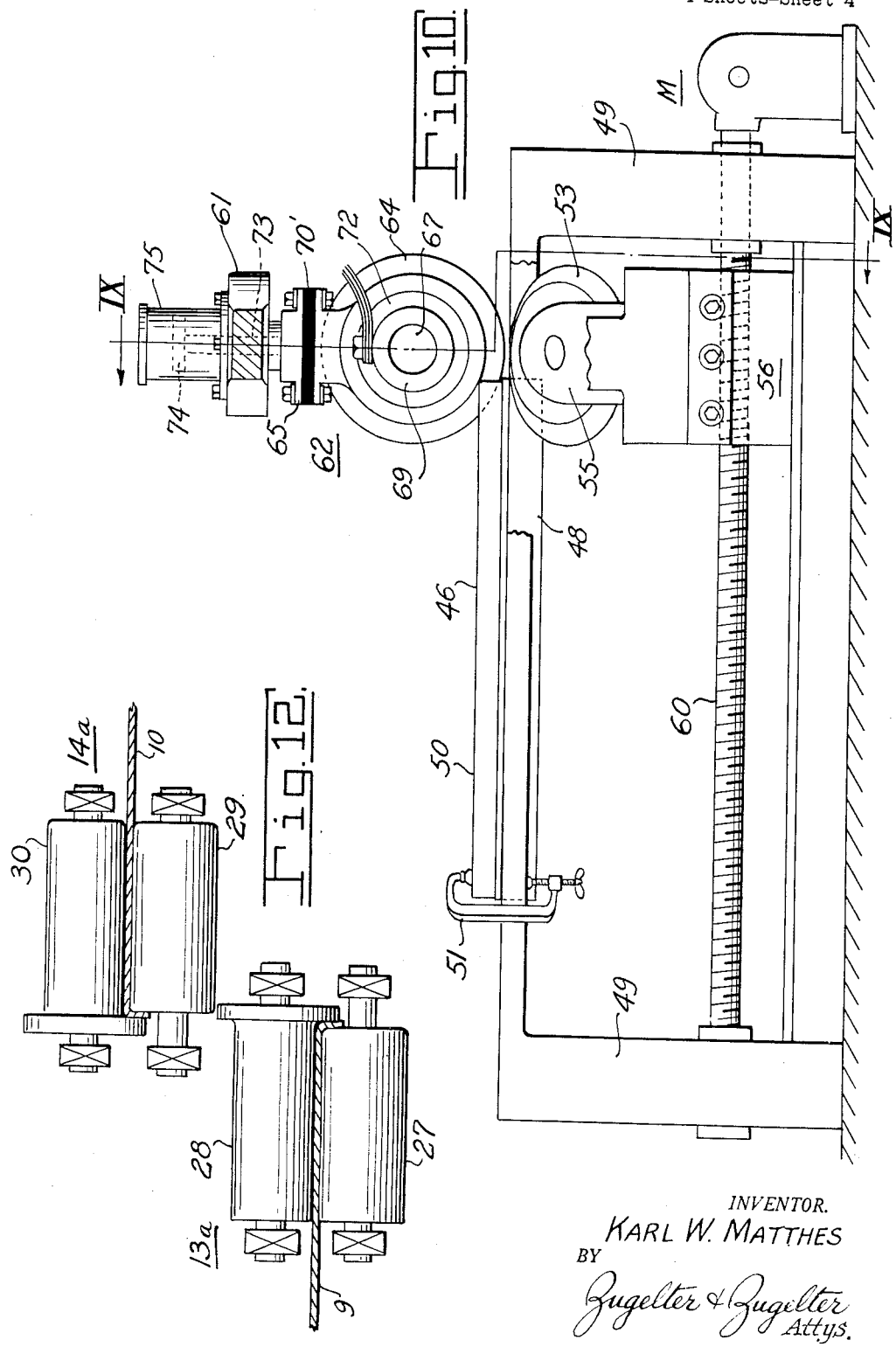

United States Patent Office 2,784,299
Patented Mar. 5, 1957

2,784,299

METHOD AND APPARATUS FOR WELDING SHEET METAL

Karl W. Matthes, Scott Township, Allegheny County, Pa., assignor to Precision Welder & Machine Co., Cincinnati, Ohio, a corporation of Ohio Application April 5, 1954, Serial No. 420,856

11 Claims. (Cl. 219—102)

This invention relates to the welding of metal sheets or strips together at adjacent edges thereof to provide a composite sheet or strip which is wider than the individual sheets or strips and which are joined together with a solid homogeneous weld.

This application is a continuation-in-part of my co-pending application Serial No. 331,239 filed in the United States Patent Office, January 14, 1953, now abandoned.

The terms "sheets" and "strips" as employed in this application may be used interchangeably. The term strip as used in the industry usually has reference to flat material produced on so-called continuous strip mills and supplied to the trade in large coils. The term sheets refers to flat stock which is sold in flat form as distinguished from the coiled. When strips are cut into lengths of shorter stock, the latter may be called a sheet. For convenience and, in so far as is necessary to an understanding of the invention, the terms "sheet" and "strip" have reference to flat material whether it is supplied in coils or in the flat.

The invention relates more particularly to a method and apparatus for so welding metal sheets that the sheets may be held stationary relative to the apparatus by which the weld is effected or the apparatus for effecting the weld may be held stationary with reference to the sheets.

Present day rolling mills are capable of rolling continuous wide strips. These strips vary in width depending upon the size of the mill. Common widths of strips as produced by such mills, are 36, 48, and 96-inches. The mills which roll the widest strip are quite expensive compared to the mills that roll the narrower strip and, furthermore, the widest strip commands a premium price.

In many industries among which is included the automobile body industry, steel sheets are required which are wider than the customary narrow sheets so-called, and may even be wider than the widest sheets now rolled. Therefore in order to obtain a sheet for body purposes that is sufficiently wide, two sheets of equal or different widths have been welded together at their edges to provide a sheet having the requisite over-all width. The welding procedures heretofore used have been expensive, time consuming, and did not always provide a sound weld.

In industries other than the automobile industry, there are well-defined needs or demands for methods and apparatus for welding metal sheets at their edges in such fashion that the weld is sound and not noticeable to the eye after the weld has been completed and the surface of the sheets at the weld line has been finished.

To weld sheets at their edges is a difficult operation. First of all, it is extremely difficult to provide edges that are perfectly straight and free of burrs or imperfections unless expensive machinery and extreme care is taken to condition the edges. Furthermore it is extremely difficult to butt weld the edges of sheets because of their relative thinness and the difficulty of holding the edges in such perfect contact that a weld may be effected by the so-called flash method. It is also difficult to effect the equivalent of a butt weld by using weld wire or rod to edge-weld the sheets.

In accordance with this invention I provide a method whereby sheets may be welded at their edges while held in a stationary condition or sheets may be welded continuously as they are uncoiled from reels or coils of sheet metal.

In accordance with the method, the adjacent edges of the metal sheets to be welded are flanged, preferably with a right-angled flange, so that the outside corners of the respective flanges are straight and parallel with one another when brought into engagement. The sheets thus flanged are placed in juxtaposition so that the backs of the flanges are in abutment. Opposed forces are then applied as close to the inside corners of the flanges as may be practical and to the flanges themselves. The magnitude of these forces should be such that the flanges are squeezed firmly into engagement. The squeezing pressures so applied act at relatively localized points. By moving the sheets relative to the point of localized pressure, the point of such pressure travels along the flanges during the welding operation. Electric potential is applied to the opposite side of the sheets, at the joint between the flanges, so that an electric current is passed which enters one sheet adjacent the outside corner of its flange, flows down into the flanges and thence to the other sheet at a location adjacent the outside corner of that sheet. Thus the metal affected by the squeezing pressure is heated to a temperature at which the metal becomes fluid or plastic and flows under the squeeze pressure. The squeeze pressure applied to the flanges forces the heated plastic metal upwardly into the joint to completely fill the same. As the point of the squeeze pressure is moved relative to the sheets along the flanges, the point where the current is introduced into the sheets is also moved along with it. Thus a weld is formed from one end of the flanges to the other after the fashion of a zipper which is closed by moving the slide fastener from one end of the zipper elements to the other.

In forming the flanges, it is preferred that the outside corners thereof shall be slightly rounded in order that when the flanges are in abutment, there will be a shallow groove between the outside corners of the flanges. The molten or plastic soft metal is squeezed into that groove and when it solidifies, a solid, homogeneous weld is formed.

After the weld has been effected, the flanges are trimmed flush with the bottom of the sheets and excess metal along the line of weld is trimmed off flush with the top side of the sheets. By grinding the sheets on both sides along the line of weld the finished sheet will have the appearance of a single, solid, homogeneous sheet.

An object of this invention is to provide a method whereby sheets may be edge-welded by resistance welding, as above set forth, thereby avoiding the difficulties of flash welding.

Another object of the invention is to so prepare the edges of adjacent sheets that the sheets may be held along the weld line in a positive firm relationship whereby when welding current is applied substantially no arcing or sputtering takes place, if any.

Another object of the invention is to provide apparatus whereby flanged sheets may be welded by squeezing the flanges together at a localized point and moving that point relative to the flanges, while at the same time supplying welding current to that localized point, whereby a homogeneous solid weld may be formed from one end of the flanges of the sheets to the other and all crevices and spaces between the sheets are completely filled with parent metal.

Another object of the invention is to provide apparatus whereby coiled sheets may be uncoiled and fed to a welding apparatus and, while the sheets are passing to the welding apparatus, the adjacent edges of the sheets are continuously flanged; and to provide the welding apparatus with means for receiving the flanged edges of the sheets, squeezing them together at a localized point with adequate pressure to cause weld metal to flow up into the joint between the corners of the flanges when welding current is passed from one sheet to the other through the flanges.

The foregoing and other objects and advantages of the invention will be apparent to those of ordinary skill in the art to which the invention pertains, from the following description taken in conjunction with the accompanying drawings.

In the drawings:

Figure 1 is a more or less schematic view in side elevation of apparatus arranged and constructed in accordance with an embodiment of this invention whereby sheets may be continuously flanged and welded as they are uncoiled from coils of sheet steel;

Fig. 2 is a view in section taken on line II—II of Fig. 1;

Fig. 3 is a view in section taken on line III—III of Fig. 1;

Fig. 4 is an enlarged view taken on line IV—IV of Fig. 1, showing more or less in detail the squeeze roll and roller electrode assembly in operation on the flanged edges of sheets;

Fig. 5 is a vector diagram showing the application of the forces applied by the apparatus of Fig. 4 to the sheets and to the flanges of the sheets;

Fig. 6 is an enlarged view of the flanged edges of the sheets;

Fig. 7 is a view similar to Fig. 6 showing the sheets after welding;

Fig. 8 is a view in section of the welded sheets after the weld metal and the flanges have been trimmed flush with the top and bottom surfaces thereof;

Fig. 9 is a more or less diagrammatic view of apparatus including a roller electrode and squeeze roll assembly by means of which sheets may be clamped in a stationary condition while the welding operation is performed;

Fig. 10 is a view in side elevation of the apparatus shown in Fig. 9;

Fig. 11 is a top plan view showing the sheets clamped in position with the flanged edges in abutment and in position to be welded;

Fig. 12 is a view of flanging rolls taken on line XII—XII of Fig. 1; and

Fig. 13 is a view of a modified form of electrode assembly.

The method of the invention may be practiced for continuously welding flanged edges of sheets 9 and 10 as they are uncoiled from coils as indicated at 11 and 12 in Fig. 1. The method may be practiced also in the welding of edges of smaller sheets by holding the flanged edges of the sheets stationary and progressively welding the flanged edges from end to end as shown in Figs. 9, 10 and 11.

If the method is applied to the continuous welding of sheets as they uncoil from coils 11 and 12, the coils are placed side by side. As the sheets are uncoiled, the adjacent edges are flanged by apparatus 13a and 14a to provide flanges 13 and 14.

Fig. 6 illustrates the preferred form or shape of the flanges. As there shown, the flanges are substantially right-angled, that is, each flange makes an angle of substantially ninety degrees with the body of the sheet. The outside corners 15 and 16 of the flanges are preferably rounded so that when the sheets are brought to a position where the backs of the flanges abut as shown in Fig. 6, a shallow groove 17 is formed between these corners.

The flanged edges of the sheets pass between squeeze rolls 18 and 19 which exert a high squeeze pressure at a localized area (see Fig. 4). That pressure being applied to the inside faces of the flanges 13 and 14, they are rigidly and firmly squeezed together at the localized squeeze point. Squeeze rolls 18 and 19 are mounted on spindles 21 and 22 carried by support members 23 and 24. The members 23 and 24 may be actuated by any suitable means, such as hydraulic cylinders 23a and 24b, mounted on a bed or frame 25. The members 23 and 24 are actuated by pistons 23c and 24c or from squeeze position. By employing hydraulic cylinders the squeeze rolls will maintain a full squeeze pressure at all times on the flanges 13 and 14.

As shown in Fig. 4, the squeeze rolls 18 and 19 may be adjusted for angularity so that the angle B between them may be varied from say about 180° to about 90°. To provide for this angular adjustment, the cylinders are pivotally mounted in housings 23d and 24d and provided with adjustable clamping bolts 23e and 24e. The angle B may be varied according to the size and thickness of the flanges and the kind of metal of which the sheets are composed, and for other operating reasons. As shown the perimeters 18a and 19a, the squeeze rolls 18 and 19 that engage the flanges, are relatively sharp; also the rims are so beveled that they fit into the inside corners of the flanges 13 and 15 to exert high pressure at the location near the bottom of the groove 17.

Electric welding current is supplied to the sheets at a location either directly above or adjacent to the point of maximum squeeze pressure of the rolls 18 and 19. The current enters one sheet adjacent the outside corner thereof, flows downwardly into the flanges and thence upwardly to the other sheet at a location adjacent its outside corner. That current heats the metal in the flanges near the bottom of the groove 17 to a condition of plastic fusion. The fused, plastic, metal is squeezed upwardly to fill the groove 17 as shown in Fig. 7.

Since the flanges 13 and 14 are formed continuously as the sheets uncoil from coils 11 and 12, the point at which the pressure is applied by the squeeze rolls and the point or area into which the current is passed, are stationary relative to each other but move relative to the sheets. Thus as the sheets are fed through the squeeze rolls with welding current applied, fused plastic metal is continuously formed and squeezed into the space between the outside corners 15 and 16 to form a bead in groove 17 on the top surface oof the sheets, and thereby effect a continuous progressive weld.

The fused metal bead and the flanges are trimmed flush with the top and bottom sides of the sheets. The welded sheets are thus formed into a single unitary sheet and pass to a recoiler such as shown at 26 onto which it is wound.

Figure 2 illustrates the relative positions of the sheets as they uncoil from coils 11 and 12, while the relative positions of the flanged edges of those sheets are illustrated in Fig. 3.

As illustrated in Fig. 1, the flanging of the edges of the sheets from coils 11 and 12 is performed by the flanging apparatus 13a and 14a. That apparatus comprises backing and flanging rolls 27 and 28, and 29 and 30 respectively (see Fig. 12). As the leading ends of the sheets are flanged, they are threaded into the space between the squeeze rolls 18 and 19. These rolls are then adjusted until they provide the required squeeze pressure, after which the sheets are pulled on through the machine. To save metal, a length of sheet metal may be spliced to the leading ends of the flanged sheets emerging from the squeeze rolls and the welding current is applied. By connecting that lentgh of sheet to the recoiler 26, the tension for pulling the sheets through the squeeze rolls may be supplied by the recoiler. Once the machinery is in operation, the leading ends of new coils 11 and 12 may be spliced to the trailing ends of nearly spent coils, thereby making it unnecessary to tack or weld a dummy sheet to the leading ends of the welded sheets.

The welding current may be applied to the sheets by means of a roller electrode assembly 30 that comprises spaced conducting disks or wheels 31 and 32 that are insulated from each other by means of an insulating spacer 33. The disks 31 and 32 are appropriately secured together and provided with spindles 34 and 35 respectively. Pressure is applied to the disks 31 and 32 of sufficient value to maintain good, non-arcing electrical contact with the sheets. Alternating current potential or direct current may be supplied to the spindles 34 and 35 to provide the current flow from one wheel 31 down through the metal of the flanges, to wheel 32. As shown in Fig. 4 the insulator 33 is recessed to provide an annular recess 33' of relatively shallow depth. The insulator may be designed to make contact with the top surface of the molten metal squeezed up into the groove 17.

The spindles 34 and 35 are journaled in a yoke 36 which is guided in a housing frame 36a and actuated by a power cylinder 36b mounted on the yoke. The cylinder has a piston 36c connected by a rod 36d to yoke 36a.

In order that wheels 31 and 32 may be supplied with electric power or voltage, the legs of the yoke 36 are split as shown in Fig. 4 and provided with insulators 36e in the joint of the legs. The upper and lower parts of the legs are bolted together as shown. Flexible conducting leads 36f and 36g are bolted to the legs of yoke 36 located below the joints thereof. These leads supply the current required for welding.

An alternate arrangement of roller electrode is shown in Fig. 13. In that arrangement the conducting wheels 31' and 32' may be physically separated from each other and the spindles 34' and 35' may be mounted in the legs 36' and 37' of a yoke 36'a. As shown the legs 36' and 37' are bolted to a guide and supporting member 36'b to which the piston rod 36d of Fig. 4 may be connected. The leads for supplying the power to the wheels 31' and 32' are bolted to the legs 36' and 37' as shown. The legs 36' and 37' are insulated from each other and from the supporting member 36'b by means of an insulating spacer 36'c.

As shown in Fig. 13 the wheels 31' and 32' are disposed at an angle to each other and bear on the sheets or strips to be welded at a location close to the outside corners of the abutting flanges thereof.

In a continuous welding operation, the apparatus may be provided with means such as a back-up roll 37 and a scarfer 38 for removing the flanges 13 and 14 after the weld has been completed. The flange metal may be coiled on a reel 38a if desired. Similarly a scarfing device or knife 39 and a back-up roll 40 may be provided to remove the bead of weld metal at the top of the sheets. The removed bead may be accumulated on a reel 40a or other suitable disposal device.

In Fig. 7 the condition of the sheets after welding but before the flanges and the bead have been removed, is illustrated. As there shown, the squeeze pressure applied by rolls 18 and 19 causes the flanges to neck-in as at 41, near the inside corners thereof and to flare out more or less at the bottom.

Fig. 5 illustrates more or less schematically the vector diagram of the forces applied by squeeze rolls 18 and 19 and by the roller electrode assembly 30 to the flanges 13 and 14 and the sheets respectively. In the diagram, arrows 18' and 19' represent the forces of rolls 18 and 19 acting at right angles to flanges 13 and 14; vectors 18a and 19a represent the vertical components of the forces applied by the squeeze rolls; and vectors 18b and 19b are the resultants of the aforesaid vectors. Vectors 18' and 19' represent the effective squeezing forces exerted on the flanges 13 and 14.

Vectors 18c and 18d, and 19c and 19d, represent the forces to which the supporting structure for the wheels 18 and 19 is subjected in resisting the vertical and horizontal components 18a and 19a and 18' and 19'c, respectively. Vectors 31a and 32a represent the pressure exerted by the rollers 31 and 32 of the roller electrode assembly on the sheets on opposite sides of the groove 17 while vectors 31b and 31c represent the resisting forces of this squeeze roll supporting structure.

In Fig. 8 a finished sheet is illustrated in cross section. It will be observed that the upper and lower surfaces of the composite sheet are smooth and flush at the welded joint. The darkened area 42 represents the metal which was heated to plastic fusion and cooled to a solid state.

There are many needs in industry for effective methods of, and means for, welding the edges of sheets that are small compared to the sheets coming off coils such as indicated at 11 and 12. For example, in the sink top industry, steel sheets are welded together. Heretofore such welding has been of the lap weld type. This type of weld results in a bump in the finished product and is not particularly sightly. Where small sheets are to be welded in accordance with the method of this invention, the procedure illustrated by Figs. 9, 10 and 11 may be employed. As shown in Figs. 10 and 11 relatively small sheets 45 and 46 are provided with flanges 47 and 48 (see Fig. 9). It is preferred that these flanges be like or similar to the flanges illustrated in Figs. 3, 4 and 6.

Sheets 45 and 46 are placed on a frame or stand 49 and the outer edges thereof are made fast by means of bars 50 that are clamped by any suitable means—C clamps 51 for example—to the frame. The sheets when clamped are so positioned that the flanges 47 and 48 are back to back as shown in Fig. 9. The machine is provided with squeeze rolls 52 and 53 which are rotatably supported in journal housings 54 and 55 secured as shown to a base member 56. Rolls 52 and 53 may be included in the same type of assembly as for the squeeze rolls 18 and 19 of Fig. 4, and may be actuated by the same type of mechanism. The base member 56 may be provided with skids or other suitable means 56a whereby the base and the squeeze roll assembly may be moved back and forth on a bed 57, in a direction lengthwise of the flanges 47 and 48. The frame or base 56 with its attached squeeze rolls and bearing housings may be moved back and forth by any suitable means such as screws 59 and 60 driven by a motor M. A yoke 61 of inverted U-shape may be attached to the ends of the bed 56 as shown in Figs. 9 and 10 to carry a roller electrode assembly 62. As shown the roller electrode assembly includes conducting disks or wheels 63 and 64 which are spaced and insulated from each other by means of an insulator 65. The disks are secured together and provided with spindles 66 and 67 that are rotatably mounted in conducting sleeves 68 and 69 to which the electrical potential may be applied. The sleeves 68 and 69 are mounted in a split yoke 70, the upper part being insulated at 70' from the lower part. The sleeves 68 and 69 may be insulated from the yoke by means of insulating bushings 71 and 72. The top of the yoke 70 may be connected to a rod 73 of a piston 74 that works in a cylinder 75 to which either pneumatic or hydraulic pressure may be applied to move the electrode wheels 63 and 64 downwardly into contact with the sheets 45 and 46 or upwardly and away therefrom. By moving the yoke 61 and the bed 56 lengthwise of the flanges 47 and 48 on the bed 57, the squeeze rolls 52 and 53 and the roller electrode wheels 63 and 64 are moved from one end of the flanges 47 and 48 to the other, thereby effecting a continuous, progressive weld from one end of the flanges to the other.

When the sheets 45 and 46 have been welded as shown and described in connection with Figs. 9 to 11, the flanges and the bead of weld metal may be trimmed flush with the bottom and top of the sheets. The principle of welding in the case illustrated in Figs. 9 to 11 is the same as that described in connection with Fig. 1 and the other views relating thereto.

By means of the method and apparatus herein disclosed, it is possible to edge-weld a pair of sheets without resorting to butt-welding procedure which in case of thin sheets would be impractical if not impossible. By first flanging the edges of the sheets, the outside corners thereof can be and are made true and straight. The flanges provide a means whereby the sheets may be held with sufficient firmness and accuracy to effect a solid, sound, and homogeneous weld. The method and the apparatus are applicable to continuous welding of sheets which are uncoiled from coils of sheet metal as well as to smaller sheets of square or rectangular form.

Having thus described the invention, what is claimed as new and desired to be secured by Letters Patent is:

1. Apparatus for continuously welding strips of sheet metal at adjacent edges, comprising means for forming substantially right-angled flanges on the adjacent longitudinal edges of the sheets, squeeze rolls disposed to engage the inside faces of said flanges adjacent the inside corners thereof to squeeze them firmly into engagement, means for actuating said rolls into and out of said inside flange corners, a roller electrode comprising spaced disks adapted to firmly engage the edges of said flanged sheets on the surfaces opposite said squeeze rolls, whereby when voltage is applied to said disks and the squeeze points of the rolls and the pressure points of the electrode disks travel along said flanges and sheets respectively, current flows from one electrode into said flanges and thence to the other electrode, thereby forming fused, plastic metal in the flanges under said electrodes, the same being squeezed towards the electrodes to so fill the gap between the outside corners of the flanges that, as the metal cools, a continuous solid weld is formed.

2. A machine as in claim 1, in which the flange forming means is arranged to form rounded outside corners on the flanges whereby a groove is formed between said corners into which the fused metal is squeezed.

3. A machine according to claim 1, in which the electrode disks are provided with a spacer of insulating material extending to a point adjacent the rims of the disks, thereby to provide a shallow annular groove into which plastic, soft metal may be squeezed to form a bead of solid metal.

4. A machine for welding sheets of metal at adjacent edges, said edges having been flanged in the same direction from the plane of the sheets, said machine having a pair of squeeze rolls disposed at such an angle that the rims thereof substantially enter the inside corners of the flanges and squeeze the flanges together, bearings for said squeeze rolls whereby the rolls may be actuated, means for actuating said bearings and rolls into and out of said inside flange corners, a roller electrode disposed to engage said sheets at a location over the squeeze rolls and at points adjacent the outside corners of the flanges, supporting means for said roller electrode, and means for moving said electrode supporting means and the electrode into and out of engagement with said sheets.

5. A machine for welding sheets of metal at adjacent edges, said edges having been flanged in the same direction from the plane of the sheets, said machine having a pair of squeeze rolls disposed at such an angle that the rims thereof substantially enter the inside corners of the flanges and squeeze the flanges together, bearings for said squeeze rolls, a roller electrode disposed to engage said sheets at a location over the squeeze rolls and at points adjacent the outside corners of the flanges, supporting means for said roller electrode, means for moving said electrode supporting means and the electrode into and out of engagement with said sheets, a movable supporting structure for the squeeze rolls and the roller electrode whereby the same may be moved to and fro in a direction lengthwise of the flanges of the sheets, and means for holding the sheets stationary as the electrode and squeeze rolls traverse said flanged edges.

6. Apparatus for edge welding flat sheets of metal which are provided with flanges along the edges to be joined by a weld, the flanges being abutted back to back, comprising rotatable squeeze rolls having means for so mounting them that the included angle between intersecting planes containing the respective rims of said rolls, the planes being perpendicular to the respective axes of rotation of the rolls, may be varied between approximately 180° and 90°, means for yieldingly urging said wheels towards each other to provide squeeze pressure to the inside corners of said flanges, spaced roller electrodes disposed to engage said sheets at a location adjacent the outside corners of said flanges and approximately opposite the point of engagement of the squeeze rolls with said flanges, and means for moving the sheets relative to the squeeze rolls and said roller electrode, whereby when a voltage is applied to said roller electrodes of sufficient value, the current flow through the flanges of said sheets adjacent the squeeze point of said rolls will heat the metal in the flanges at said location to such a condition of fused plasticity as to be squeezed by the rolls into the space between the outside corners of said sheets and effectively weld the same.

7. Apparatus according to claim 6 in which the rims of the squeeze rolls have angular surfaces which intersect to form a relatively sharp rim, said sharp rim being disposed to engage the flanges in the inside corners thereof at locations adjacent the bottom surface of the sheets, said yielding means causing the squeeze rolls to neck-in the flanges and force plastic soft metal upwardly into the space between the outside corners of the flanges thereby welding the sheets together.

8. A method of welding sheets edge to edge that comprises forming a substantially right-angled flange along an edge of each sheet, placing said sheets together so that the flanges abut back-to-back, applying opposed constricting forces to the flanges at the inside corners thereof at a location adjacent the under surfaces of the sheets, passing electric current from the opposite surface of the sheets from a point adjacent the outside corner of one flange, thence down into the flanges and to the other sheet at a location adjacent its outside corner and moving the sheets so that the flanges pass through the point of squeezing pressure and current application, whereby the metal in the flanges between the squeeze points is heated to a fused plasticity and forced upwardly into the joint between the outside corners of the sheets, thereby forming a weld, and then trimming the flanges at the point of constriction flush with the under surface of the sheets and trimming the excess metal on the opposite surface of the sheet flush with that surface.

9. Apparatus for welding a pair of metal sheets at adjacent edges comprising means for forming right-angled flanges along the adjacent edges of each sheet, means for supporting said sheets in side-by-side relation with said flanges disposed back-to-back, squeeze rolls having relatively sharp rims disposed to operate on the angles of said flanges adjacent the inside corners thereof for squeezing said flanges together and necking the same at the squeeze point, and a roller electrode having means for engaging said sheets at locations adjacent the outside corners of the flanges thereof for passing electric current from one electrode into its engaged sheet, thence into said flanges to the other sheet and to the electrode means engaging the same, thereby to form plastic weld metal in the joint between the flanges and said electrode means, and means for moving the sheets relative to the electrode and said squeeze rolls.

10. Apparatus for welding metal sheets having right-angled flanges at adjacent edges thereof to form a single sheet having a smooth surface on each side of the sheet, including the surfaces of the sheet along the line of weld, said apparatus comprising means for applying opposed squeezing pressures to the inside faces of said flanges at a location close to the inside corners of the flanges to effect necking of the flanges at the squeeze point and separation of the flanges from said point to the edges thereof, and means for passing electric current into said sheets at a location adjacent the point of squeeze pressure that flows from a point on one sheet adjacent the outside corner of its flange into said flanges at the squeeze point and thence to the other sheet at a location adjacent the outside corner of its flange to heat the metal of a portion of the flanges to fusion, the squeezing means forcing the fused metal into the joint between the outside corners of the flanges, and means for trimming the flanges flush with one surface of the sheets and for trimming the excess weld metal on the opposite surface flush with that surface.

11. A method of welding a pair of metal sheets along adjacent edges thereof, that consists in forming a right-angled flange along the edge of each sheet, placing said sheets alongside one another with the backs of the flanges in abutment, applying opposed squeezing pressures to the backs of said flanges sufficient to neck the flanges and applying such pressure progressively from one end of said flanges to the other, then at the location of the application of said squeeze pressures passing welding current from one sheet at a point adjacent the outside corner of its flange into said flanges and thence into the other sheet at a location adjacent the outside corner of its flange, whereby molten metal is progressively formed in portions of said flanges and progressively squeezed into the space between said outside corners from one end of the flanges to the other to form a solid continuous weld.

References Cited in the file of this patent

UNITED STATES PATENTS

| | | |
|---|---|---|
| 1,944,094 | Mayweg | Jan. 16, 1934 |
| 2,009,884 | Free | July 30, 1935 |
| 2,025,744 | Hathorn | Dec. 31, 1935 |
| 2,062,875 | Gardner | Dec. 1, 1936 |
| 2,147,868 | Von Henke | Feb. 21, 1939 |
| 2,233,233 | Williams | Feb. 25, 1941 |
| 2,452,498 | Schwartz | Oct. 26, 1948 |